T. E. MURRAY, Jr.
METHOD OF MAKING WELDED METAL RINGS.
APPLICATION FILED OCT. 4, 1917.
1,259,270.
Patented Mar. 12, 1918.
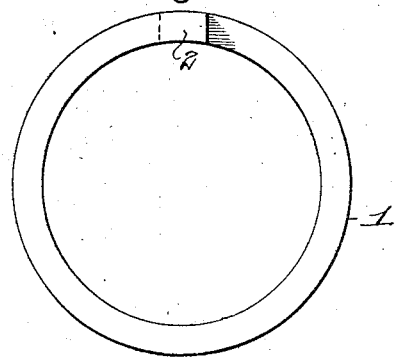
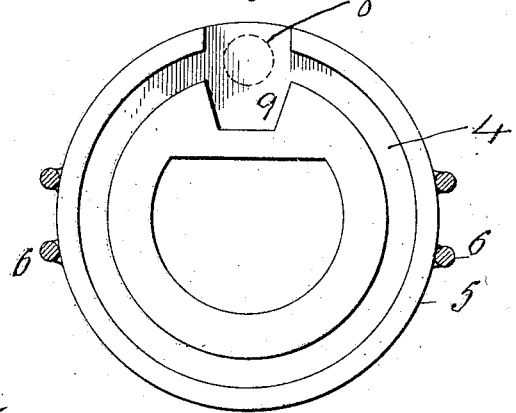
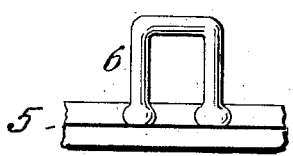
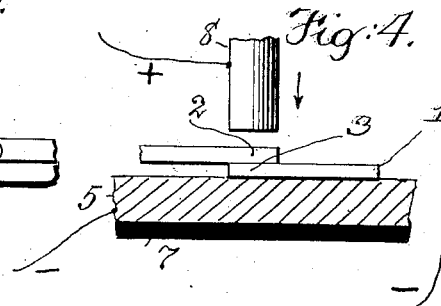
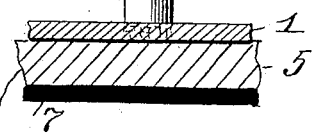
INVENTOR
Thomas E. Murray Jr.
BY
his ATTORNEY

UNITED STATES PATENT OFFICE.

THOMAS E. MURRAY, JR., OF BROOKLYN, NEW YORK.

METHOD OF MAKING WELDED METAL RINGS.

1,259,270.  Specification of Letters Patent.  Patented Mar. 12, 1918.

Application filed October 4, 1917. Serial No. 194,682.

*To all whom it may concern:*

Be it known that I, THOMAS E. MURRAY, Jr., a citizen of the United States, residing at Brooklyn, in the county of Kings and State of New York, have invented a certain new and useful Improvement in Methods of Making Welded Metal Rings, of which the following is a specification.

The invention is a method of making a truly circular metal ring; said method comprising the several steps more particularly pointed out in the claims.

In the accompanying drawings—

Figure 1 is a plan view of the ring, showing the lapped ends prior to welding. Fig. 2 is a plan view of the holder for the ring during the welding operation. Fig. 3 is an elevation of one of the handles of the holder. Fig. 4 shows the relation of the lapped ends of the ring when in the holder to the vertically moving presser tool before the welding is done. A portion of the holder is shown in section. Fig. 5 is a similar view, showing the ends of the ring welded and in section, with the presser tool in lowermost position.

Similar numbers of reference indicate like parts.

The object here is to make a flat ring of exact diameter, without joining abutting ends of the metal when bent in truly circular form, in which case the take-up inevitably occurring, will render the completed ring no longer truly circular, and hence inexact in diameter. I proceed as follows: A flat ring 1 of metal is made with overlapping ends 2, 3, so that after adjusting a definite amount of overlap, the ring is truly circular, as shown in Fig. 1. In order to hold the ring in this adjusted position, I place it in a truly circular groove 4 formed in the body of a holder 5 of metal. Said holder is provided with handles 6, by which, after the ring is adjusted in the groove 4, said holder may be placed on any suitable support, preferably of refractory insulating material, below the vertically movable presser tool 8, a portion 9 of the body of the holder being cut away, so that the lapped ends 2, 3 of the ring come directly beneath the presser tool 8, as shown in Fig. 4. The holder 5 is connected in circuit to form one electrode and the presser tool 8 forms the other electrode. In operation, the presser tool is moved forcibly downward to compress together the lapped ends 2, 3 of the ring, and current is established through the joint. The metal of the lapped ends is rendered viscous, so that by reason of the strong compression of the same by the presser tool, said ends are welded and condensed, as shown in Fig. 5, to become no thicker than the metal of the rest of the ring. Any excess of metal extruded at the joint is then removed by grinding, or in any other suitable way. The completed ring, because of the accurately lapped ends, is of an exact predetermined diameter and of uniform cross section.

I claim:

1. The method of making a flat ring of predetermined diameter and uniform cross sectional area, which consists in first forming an annular body of metal of truly circular form with ends overlapping to a predetermined extent, then subjecting said ends to electrical heating to render the same viscous, then compressing said ends to condense the metal thereof to a cross sectional area uniform with the cross sectional area of the remainder of said ring and then removing any excess metal extruded at the joint.

2. The method of making a flat ring of predetermined diameter and cross sectional area, which consists in first forming an annular body of metal of truly circular form with ends overlapping to a predetermined extent, then placing said body in a groove in a suitable holder adapted to maintain said body in said truly circular form while subjected to lateral compression at the joint, then subjecting said ends to electrical heating to render the same viscous, then compressing said ends to condense the metal thereof to a cross sectional area uniform with the cross sectional area of the remainder of said ring, and then removing any excess metal extruded at said joint.

In testimony whereof I have affixed my signature in presence of two witnesses.

THOMAS E. MURRAY, JR.

Witnesses:
GERTRUDE T. PORTER,
MAY T. McGARRY.